United States Patent
Chapman

(10) Patent No.: US 7,639,620 B2
(45) Date of Patent: *Dec. 29, 2009

(54) PACKET FIBER NODE

(75) Inventor: John T. Chapman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/682,832

(22) Filed: Mar. 6, 2007

(65) Prior Publication Data

US 2007/0150927 A1 Jun. 28, 2007

Related U.S. Application Data

(63) Continuation of application No. 09/894,958, filed on Jun. 27, 2001, now Pat. No. 7,209,442.

(51) Int. Cl.
*H04J 3/14* (2006.01)
(52) U.S. Cl. .............. 370/235; 370/229; 370/352; 725/129
(58) Field of Classification Search ........... 370/401, 370/489, 485, 235, 229, 351–354, 356, 395.5–395.52, 370/400; 725/129
See application file for complete search history.

(56) References Cited

U.S. PATENT DOCUMENTS

| | | | |
|---|---|---|---|
| 4,977,593 A | 12/1990 | Balance | |
| 5,153,763 A | 10/1992 | Pidgeon | |
| 5,457,678 A | 10/1995 | Goeldner | |
| 5,604,735 A | 2/1997 | Levinson et al. | |
| 5,724,510 A | 3/1998 | Arndt et al. | |
| 5,784,597 A | 7/1998 | Chiu et al. | |
| 5,805,602 A | 9/1998 | Cloutier et al. | |
| 5,918,019 A | 6/1999 | Valencia | |
| 5,931,954 A | 8/1999 | Hoshina et al. | |
| 5,933,420 A | 8/1999 | Jaszewski et al. | |
| 5,963,557 A | 10/1999 | Eng | |

(Continued)

FOREIGN PATENT DOCUMENTS

WO 0072509 11/2000

(Continued)

OTHER PUBLICATIONS

Cable Television Laboratories, Inc., Interim Specification, Data-Over-Cable Service Interface Specifications, Radio Frequency Interface Specification, SP-RFIv1.1-I04-000407, Apr. 7, 2000, 376 pages.

(Continued)

*Primary Examiner*—Phuc H Tran
(74) *Attorney, Agent, or Firm*—Stolowitz Ford Cowger LLP

(57) ABSTRACT

A packet fiber node is described for use in an access network such as, for example, a cable network. The packet fiber node may differ from convention RF fiber nodes deployed in a cable network in that the packet fiber node is configured to communicate with the Head End of the network using baseband optical signals rather than frequency modulated optical signals. According to a specific embodiment of the present invention, one or more packet fiber nodes may be deployed in a cable network to service a plurality of different subscriber groups which are serviced by a single, conventional RF fiber node.

18 Claims, 11 Drawing Sheets

U.S. PATENT DOCUMENTS

| | | | |
|---|---|---|---|
| 6,023,769 A | 2/2000 | Gonzalez | |
| 6,078,595 A | 6/2000 | Jones et al. | |
| 6,101,180 A | 8/2000 | Donahue et al. | |
| 6,137,793 A * | 10/2000 | Gorman et al. | 370/360 |
| 6,233,246 B1 | 5/2001 | Hareski et al. | |
| 6,275,990 B1 | 8/2001 | Dapper et al. | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,693,878 B1 | 2/2004 | Daruwalla et al. | |
| 6,697,970 B1 | 2/2004 | Chisholm | |
| 6,698,022 B1 | 2/2004 | Wu | |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,819,682 B1 | 11/2004 | Rabenko et al. | |
| 6,847,635 B1 | 1/2005 | Beser | |
| 6,853,680 B1 * | 2/2005 | Nikolich | 375/222 |
| 6,857,132 B1 * | 2/2005 | Rakib et al. | 725/114 |
| 6,901,079 B1 | 5/2005 | Phadnis et al. | |
| 6,950,399 B1 | 9/2005 | Bushmitch et al. | |
| 6,959,042 B1 | 10/2005 | Liu et al. | |
| 6,993,016 B1 | 1/2006 | Liva et al. | |
| 6,996,129 B2 | 2/2006 | Krause et al. | |
| 7,007,296 B2 | 2/2006 | Rakib et al. | |
| 7,023,882 B2 | 4/2006 | Woodward, Jr. et al. | |
| 7,039,049 B1 | 5/2006 | Akgun et al. | |
| 7,065,779 B1 | 6/2006 | Crocker et al. | |
| 7,067,734 B2 | 6/2006 | Abe et al. | |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun | |
| 7,149,223 B2 * | 12/2006 | Liva et al. | 370/401 |
| 7,161,945 B1 | 1/2007 | Cummings | |
| 7,164,690 B2 * | 1/2007 | Limb et al. | 370/443 |
| 7,197,052 B1 | 3/2007 | Crocker | |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,359,332 B2 | 4/2008 | Kolze et al. | |
| 7,363,629 B2 | 4/2008 | Springer et al. | |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0052927 A1 | 5/2002 | Park | |
| 2002/0067721 A1 | 6/2002 | Kye | |
| 2002/0073432 A1 * | 6/2002 | Kolze | 725/111 |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1 | 1/2003 | Conover et al. | |
| 2003/0058794 A1 | 3/2003 | Pantelias et al. | |
| 2003/0061415 A1 | 3/2003 | Horton et al. | |
| 2003/0066087 A1 * | 4/2003 | Sawyer et al. | 725/111 |
| 2003/0067944 A1 | 4/2003 | Sala et al. | |
| 2003/0136203 A1 | 7/2003 | Liva et al. | |
| 2003/0140131 A1 | 7/2003 | Chandrashekhar et al. | |
| 2003/0214943 A1 | 11/2003 | Engstrom et al. | |
| 2003/0214982 A1 | 11/2003 | Lorek et al. | |
| 2004/0039466 A1 | 2/2004 | Lilly et al. | |
| 2004/0045037 A1 | 3/2004 | Cummings et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1 | 8/2004 | Dong et al. | |
| 2004/0163129 A1 | 8/2004 | Chapman et al. | |
| 2004/0181800 A1 | 9/2004 | Rakib et al. | |
| 2004/0244043 A1 | 12/2004 | Lind et al. | |
| 2004/0248530 A1 | 12/2004 | Rakib et al. | |
| 2005/0018697 A1 | 1/2005 | Enns et al. | |
| 2005/0122976 A1 | 6/2005 | Poli et al. | |
| 2005/0138669 A1 | 6/2005 | Baran | |
| 2005/0198684 A1 | 9/2005 | Stone et al. | |
| 2005/0201399 A1 | 9/2005 | Woodward, Jr., et al. | |
| 2005/0226257 A1 | 10/2005 | Mirzabegian et al. | |
| 2005/0232294 A1 | 10/2005 | Quigley et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |
| 2005/0289623 A1 | 12/2005 | Midani et al. | |
| 2006/0002294 A1 | 1/2006 | Chapman et al. | |
| 2006/0126660 A1 | 6/2006 | Denney et al. | |
| 2006/0159100 A1 | 7/2006 | Droms et al. | |
| 2006/0168612 A1 | 7/2006 | Chapman et al. | |
| 2007/0274345 A1 | 11/2007 | Taylor et al. | |
| 2008/0037545 A1 | 2/2008 | Lansing et al. | |

FOREIGN PATENT DOCUMENTS

| | | |
|---|---|---|
| WO | 2005117310 | 12/2005 |
| WO | 2005117358 | 12/2005 |

OTHER PUBLICATIONS

3COM, High-Speed Cable Internet Solutions, http://www.3com.com/cablenow/pdf/7125dsht.pdf, Dec. 1999, 4 pages.

Cable Television Laboratories,Inc., Interim Specification, Data-Over-Cable Service Interface Specifications, Radio Frequency Specification, SP-RFIv1.1-I02-990731, Jul. 30, 1999, 353 pages.

Thompson, et al. IPv6 Stateless Address Autoconfiguration, RFC 2462, Dec. 1998, pp. 1-24, Network Working Group.

Thompson, et al. IPv6 Stateless Address Autoconfiguration, RFC 4862, Sep. 2007, pp. 1-29, Network Working Group.

Hawa et al., "Quality of Service Scheduling in Cable and Braodband Wireless Access Systems," at http://www.ittc.ku.edu/publications/documents/Hawa2002_iwqos_paper.pdf, downloaded on Sep. 29, 2008.

Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.

Postel, J., "User Datagram Protocol", RFC 768, Aug. 28, 1980, 3 pgs.

Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, © 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16-2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Lau, J., et al., "Layer Two Tunneling Protocol—Version 3 (L2TPv3)," RFC 3931, Mar. 2005, 94 pages.
Adoba, et al. Extensible Authentication Protocol (EAP), RFC 3748, Jun. 2004, pp. 1-64, Standards Track.
ITU-T Telecommunications Standardization Sector of ITU, Series J: Cable Networks And Transmission of Television, Sound Programme and other Multimedia Signals, Interactive Systems for Digital Television Distribution, Recommendation J. 122, Dec. 2002, 506 pages, International Telecommunications Union.
Cable Television Laboratories, Inc., "DOCSIS Radio Frequency Interfaces Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Data Over Cable Service Interface Specification, Aug. 4, 1997.
Ethereal: Display Filter Reference: DOCSIS Upstream Channel Descriptor, Webarchivedate Apr. 27, 2004.
DOCSIS Set Top Gateway (DSG) interface specification, Feb. 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Phuc H. Tran, USPTO Office Action Paper No.20080427, May 1, 2008, 10 pages.
U.S. Appl. No. 11/292,725, filed Dec. 1, 2005, Bernstein et al., "Advanced Multicast Support for Cable".
Adoba, et al., Extensible Authentication Protocol (EAP), RFC 3748, Jun. 2004, pp. 1-64, Standards Track.
Bhattacharyya, et al., "An Overview of Source-Specific Multicast (SSM)", RFC 3569, Jul. 2003.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Cable Television Laboratories, Inc., "Data-Over-Cable Service Interface Specifications Modular CMTS", CM-SP-DEPI-W03-050302, 49 pgs., Copyright 2005.
Cable Television Laboratories, Inc., "DOCSIS Radio Frequency Interface Specification", CM-SP-RFIv2.0-I10-051209, 538 pgs., Dec. 9, 2005.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Chapman, John T., "Remote PHY Technical White Paper Addendum," Downstream External PHY Interface Specification, Cisco Systems, Inc., EDCS-377253, Jan. 24, 2005.
Cisco Systems, Inc., DHCP and the DOCSIS Configuration File for Cable Modems (DOCSIS 1.0), Document ID: 10961, Sep. 16, 2004.
Cisco Systems, Inc., "Downstream External PHY Interface Specification", SP-DEPI-W2-041101A.DOC, EDCS-408926, Jan. 25, 2005.
Droms, R., "Stateless Dynamic Host Configuration Protocol (DHCP) Service for IPv6", RFC 3736, Apr. 2004.
ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.
Millet, Theft of Service-Inevitable?, Dec. 2005, pp. 1-4, Communications Technology.
Ramakrishnan, Sangeeta, "Next Generation Edge—Realizing the vision of shared resources and bandwidth", SCTE Conference on Emergine Technologies, Jan. 11-13, 2005, 16 pgs.
Desai, et al., FastChannel: A Higher-Speed Cable Data Service, AT&T Labs-Research, pp. 1-13, Jan. 2002.

* cited by examiner

PACKET FIBER NODE

CROSS REFERENCE TO RELATED APPLICATIONS

The present application is a continuation of U.S. patent application Ser. No. 09/894,958, filed on Jun. 27, 2001.

BACKGROUND OF THE INVENTION

This invention relates to digital computer network technology. More specifically, the present invention relates a new fiber node configuration to be implemented in cable networks. This application incorporates the following applications by reference in their entirety for all purposes: U.S. patent application Ser. No. 09/490,761, filed on Jan. 24, 2000, U.S. patent application Ser. No. 09/606,503, filed Jun. 28, 2000, U.S. Provisional Patent Application Ser. No. 60/159,085, filed on Oct. 13, 1999, and U.S. patent application Ser. No. 09/894,864 filed on Jun. 27, 2001.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 shows a block diagram of a conventional cable network 100. The cable network 100 includes a Head End 102 which provides a communication interface between nodes (e.g. cable modems) in the cable network and external networks such as, for example, the Internet. The cable modems typically reside at the subscriber premises 110a-d.

The Head End 102 is typically connected to one or more hubs 104. Each hub is configured to service one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End 102 and the plurality of cable modems residing at the plurality of subscriber groups 110.

Communication between the Head End 102, hub 104, and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 103 and 105a,b of FIG. 1, which are typically referred to as "RF fibers".

As shown in FIG. 1, the modulated optical signals transmitted from the Head End 102 eventually terminate at the fiber node 106a. The fiber nodes maintain the RF modulation while converting from the fiber media to the coax media and back.

FIG. 2 shows a block diagram of a conventional fiber node 200 such as, for example, fiber node 106a of FIG. 1. In conventional cable networks, the fiber node 200 is responsible for converting RF modulated wavelength optical signals into electrical signals and vice versa. The RF modulated optical signals enter the fiber node 200 via downstream RF fiber 205, and are converted into electric signals by the optical-to-electric signal converter 202. The electrical signals are then amplified by downstream amplifier 204. The amplified electric signals are then passed to a diplexor 210 which transmits the electric signals over the coaxial line 209 to the plurality of cable modems.

In the reverse direction, the cable modems transmit electrical signals via the coaxial line 209 to the fiber node 200. The upstream electrical signals from the cable modems are received at the diplexor 210, and passed to the upstream amplifier 206. The upstream electrical signals are then passed from the amplifier 206 to an electric-to-optical signal converter, which converts the upstream electric signals into radio frequency wavelength modulated optical signals which are then transmitted to the Head End via upstream RF fiber 207.

Typically, the use of RF modulated optical signals in the cable network 100 only allows for very narrow opportunities to transmit IP packets. This is because most of the bandwidth of the RF modulated optical signal is used for DOCSIS related signaling between the Head End 102 and plurality of cable modems.

As a result, most conventional cable networks are not equipped to handle increased data flows relating to new and emerging broadband network applications such as video-on-demand, telephony, etc. Accordingly, there exists a continual need to improve access network configurations in order to accommodate new and emerging network applications and technologies.

SUMMARY OF THE INVENTION

According to different embodiments of the present invention, at least one packet fiber node may be provided for use in an access network such as, for example, a cable network. The packet fiber node may differ from conventional RF fiber nodes deployed in a cable network in that the packet fiber node is configured to communicate with the Head End of the network using baseband optical signals rather than frequency modulated optical signals.

According to a specific embodiment of the present invention, a packet fiber node may include at least one processor, memory, a first interface for communicating with the Head End of the access network, and a second interface for communicating with at least a portion of network nodes. In embodiments where the access network corresponds to a cable network, the network nodes will correspond to cable modems. The packet fiber node is configured to communicate with the Head End using baseband optical signals, and is further configured to communicate with at least a portion of the network nodes using modulated electrical signals. In accordance with specific embodiments of the present invention, one or more packet fiber nodes may be deployed in a cable network to service a plurality of subscriber groups which are serviced by a single, conventional RF fiber node.

An alternate embodiment of the present invention is directed to a packet fiber node which comprises a diplexor, at least one interface, and a distributed cable modem termination system (DCMTS). The packet fiber node may be configured to communicate with the Head End using baseband optical signals. Additionally, the packet fiber node may be configured to not include components for communicating with the Head End using frequency modulated optical signals. According to a specific embodiment, the packet fiber node may be configured to perform functions relating to DOCSIS MAC scheduling operations and/or functions relating to layer 1 and layer 2 protocols.

Another embodiment of the present invention is directed to a method for performing communication in a cable network. The cable network includes a Head End which communicates with a plurality of different cable modem groups using at least one upstream channel and at least one downstream channel. Spatial reuse of the upstream and/or downstream channel frequencies may be implemented using at least one packet fiber node. According to a specific embodiment, the same channel frequency may be used to communicate with at least 2 different cable modem groups which are serviced by a common RF fiber node.

Additional objects, features and advantages of the various aspects of the present invention will become apparent from the following description of its preferred embodiments, which description should be taken in conjunction with the accompanying drawings.

DETAILED DESCRIPTION

As the number of cable network subscribers increases, increased bandwidth demands are continuously being placed upon the cable network. In order to accommodate these increased demands in bandwidth, continual efforts are undertaken to increase bandwidth availability in the network, preferably by utilizing existing infrastructure.

According to different embodiments of the present invention, a plurality of different techniques are described for providing increased bandwidth availability to selected nodes in an access network. For example, according to one implementation, a baseband packet-over-fiber communication system may be implemented for providing increased data bandwidth and link budget to network nodes.

As commonly known to one having ordinary skill in the art, baseband optical signals may be transmitted over an optical fiber at a higher frequency than RF modulated optical signals. As a result, the available bandwidth of an optical fiber carrying baseband optical signals may be significantly greater than the available bandwidth of RF modulated optical signals traveling over the same optical fiber. Thus, one solution for increasing available bandwidth in the cable network is to modify conventional RF modulated optical communication equipment to include additional equipment for performing baseband optical communication.

However, this approach is undesirable since a substantial amount of infrastructure supporting RF modulated optical signals has already been installed in most conventional cable networks. Such infrastructure may generally be referred to as legacy RF cable network componentry. Thus, rather than converting all existing cable network infrastructure from RF fiber to baseband fiber, a preferred approach for increasing bandwidth availability in the cable network is to implement a solution which is compatible with the legacy RF cable network components.

Currently, extensive research is being conducted for arriving at a preferred technique for integrating baseband optical communication with broadband (e.g. RF modulated) optical communication in a single fiber node which is also configured to support (1) legacy RF downstreams, (2) legacy RF upstreams (3) packet baseband downstream communication, and (4) packet baseband upstream communication. One such technique is shown in FIG. 3A of the drawings.

Figure 3A:
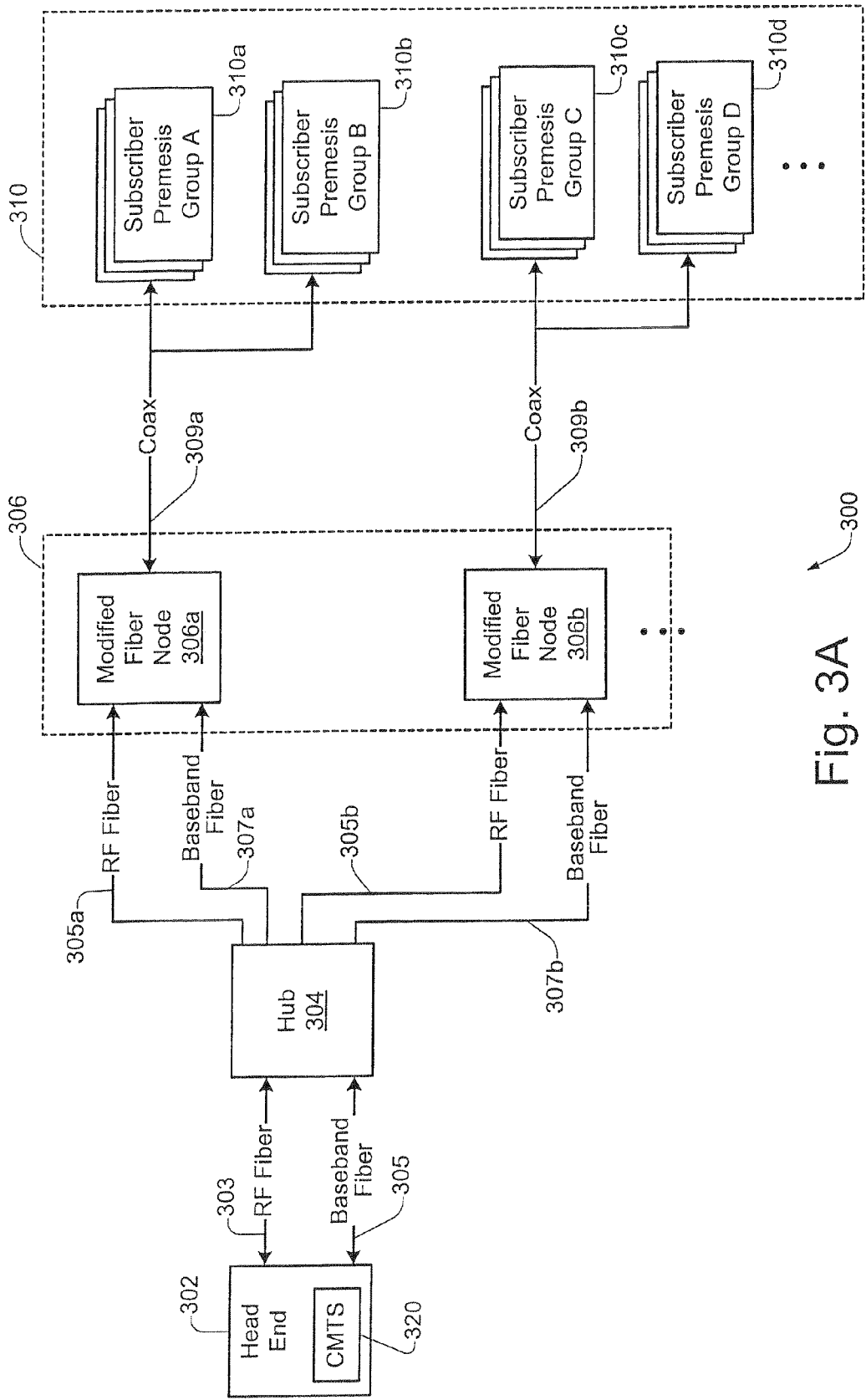
FIG. 3A shows a specific embodiment of a modified cable network 300.

FIG. 3A shows a specific embodiment of a modified cable network 300. In the example of FIG. 3A, the cable network 300 has been configured to enable baseband optical signal communication between the Head End 302 and the plurality of fiber nodes 306, in addition to conventional broadband communication. Thus, the cable network 300 is configured to support both RF modulated optical signals and baseband optical signals. The technique for communicating via baseband optical signals is generally known to one having ordinary skill in the art, and is described, for example, in the reference, "Modern Cable Television Technology," by James Farmer, David Large, Walter S. Ciciora, Morgan Kaufman Publishers, Inc., 1999, ISBN: 1558604162, herein incorporated by reference in its entirety for all purposes.

As shown in FIG. 3A, the Head End 302 and hub 304 have each been modified to support communication via RF fiber 303 and baseband fiber 305. Additionally, as shown in FIG. 3A, each conventional fiber node has been modified to include additional componentry for supporting baseband optical signal communication. An example of the modified fiber node 306a is shown in FIG. 4 of the drawings.

Figure 4:
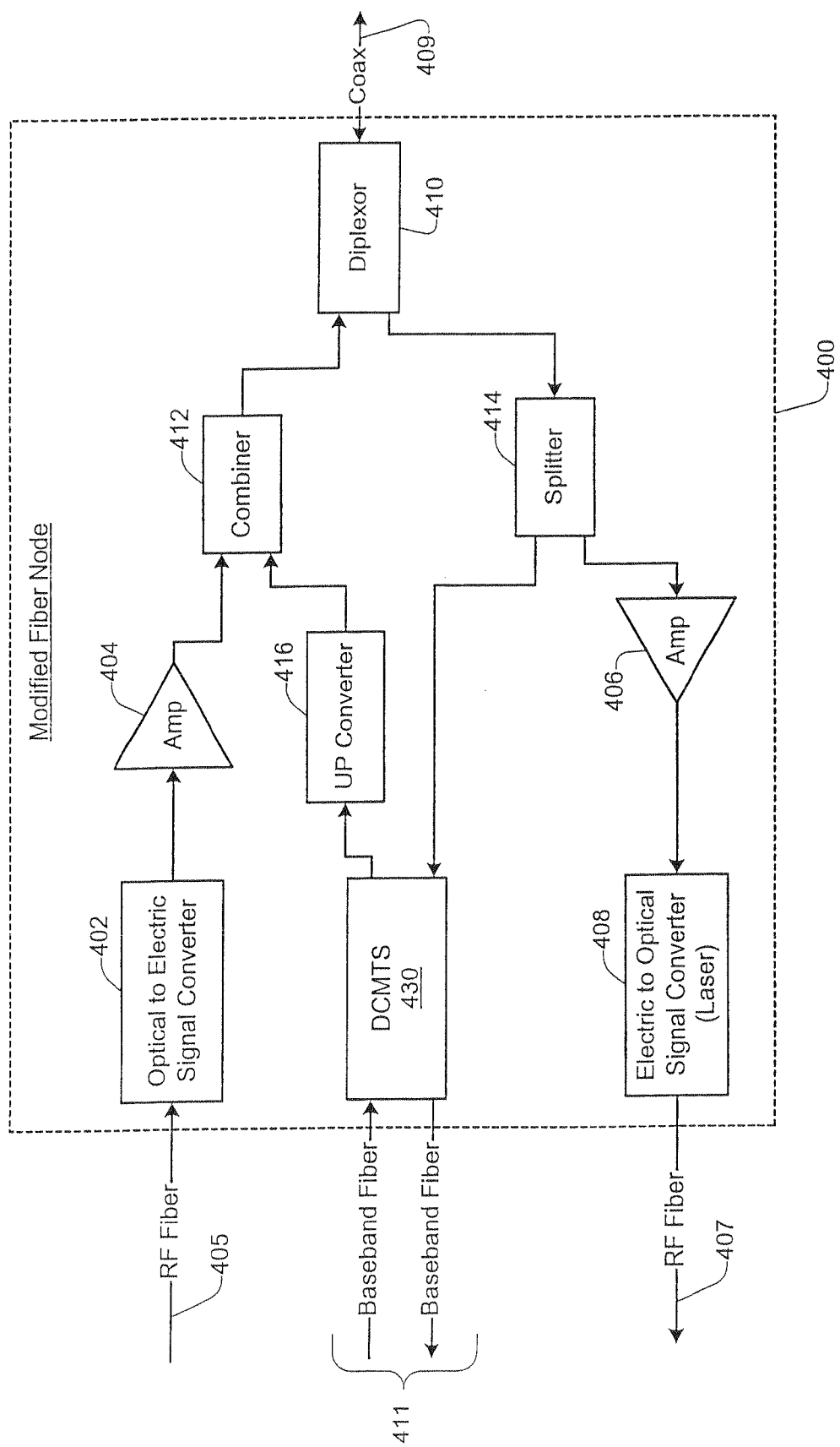
FIG. 4 shows the specific embodiment of a modified fiber node 400.

FIG. 4 shows the specific embodiment of a modified fiber node 400. In addition to the conventional fiber node components (402, 404, 406, 408, 410) which provide RF modulated optical signal functionality for interfacing RF fiber with coaxial cable, the modified fiber node 400 also includes additional circuitry for providing broadband optical signal communication functionality used for interfacing broadband fiber with conventional coaxial cable. As show in the example of FIG. 4, the baseband componentry includes a distributed CMTS (DCMTS) 430, up converter 416, signal combiner 412, and signal splitter 414.

According to a specific embodiment, the functionality of the DCMTS may include all or a portion of the functionality provided by a conventional CMTS, with the exception that the DCMTS communicates with the Head End using baseband optical signals.

According to the embodiment of FIG. 4, the DCMTS 430 is configured to receive and transmit baseband optical signals via one or more baseband fibers 411. For example, in one embodiment, the DCMTS may use one fiber for transmitting data, and another fiber for receiving data. Alternatively, a single fiber may be used for both receiving and transmitting.

One advantage of including a DCMTS in a selected fiber node is that the DCMTS is able to provide additional bandwidth between the Head End 302 and that fiber node. Another advantage of including a DCMTS in selected fiber nodes is that the DCMTS may perform, at a relatively local level, at least a portion of the scheduling or MAC functions typically performed by the CMTS at the Head End (e.g. 302) of the cable network.

Figure 7:
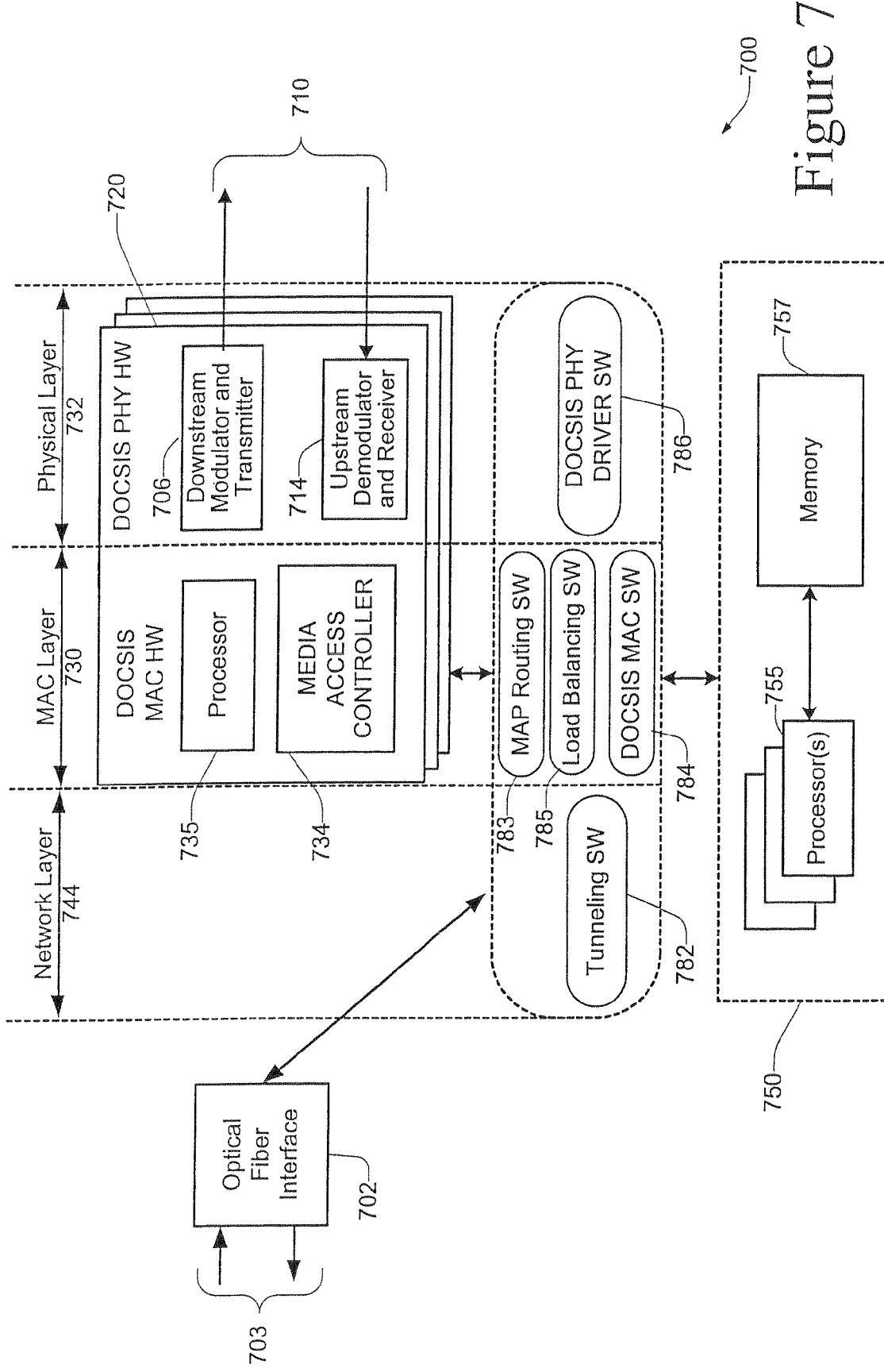
FIG. 7 provides an example of a DCMTS system 700 which may be used to implement certain aspects of this invention.
Figure 8:
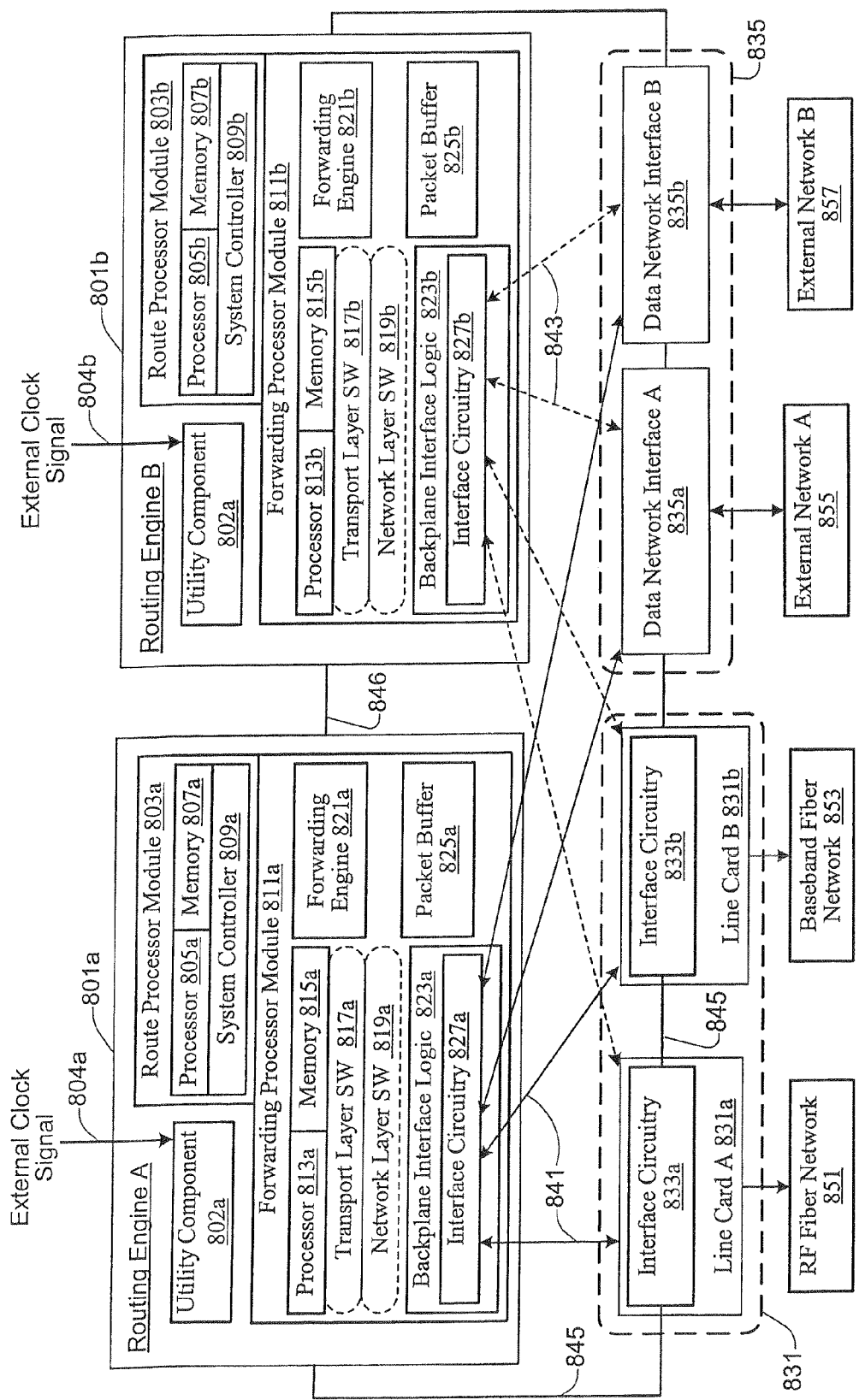
FIG. 8 shows a block diagram of a specific embodiment of a Cable Modem Termination System (CMTS) 800 which may be used to implement certain aspects of the present invention.

For example, according to different embodiments, the DCMTS may be configured to perform downstream modulation, upstream demodulation, ranging, registration, generation of channel MAP messages, generation and termination of MAC messages, encryption/decryption, and other functions, such as those, described, for example, with respect to FIGS. 7 and 8 of the drawings.

Referring to FIG. 4, downstream baseband optical signals are received at the DCMTS 430 and passed to up converter 416, where the optical signals are converted into electrical signals. The electrical signals from up converter 416 are fed to a combiner 412, which combines signals originating from the baseband fiber with signals originating from the RF fiber. The combined signals are then sent to diplexor 410 where they are transmitted over the coaxial line 409 to the plurality of cable modems residing at the subscriber premises serviced by fiber node 400. As commonly known to one having ordinary skill in the art, a primary function of the diplexor 410 is to convert electrical signals from an intermediate frequency (within the fiber node) to a relatively high frequency (for transmission over the coax cable) and vice versa.

In the reverse direction, electrical signals from the cable modems are transmitted via coax line 409 to the diplexor 410. The upstream signals are then passed from the diplexor 410 to the splitter 414. The splitter 414 separates the upstream signals, passing a first portion of the upstream signals to the DCMTS 430, and passing a second portion of the upstream signals to the Head End via components 406 and 408. According to a specific embodiment, the DCMTS 430 and CMTS (at the Head End) may each receive a copy of the upstream spectrum, and extract desired signals from selected portions of the upstream spectrum.

Although modified cable network of FIG. 3A describes one solution for providing increased bandwidth capacity between the Head End 302 and the plurality of fiber nodes 306, it does not solve the problem of providing increased bandwidth capacity on coaxial cable lines 309a and 309b, which provide the communication paths between the fiber nodes 306 and the plurality of subscriber groups 310.

One solution for addressing this latter problem of providing increased bandwidth capacity to the plurality of subscriber groups 310 is to increase the number of fiber nodes servicing the plurality of subscriber groups. An example of this is shown in FIG. 3B of the drawings.

Figure 3B:
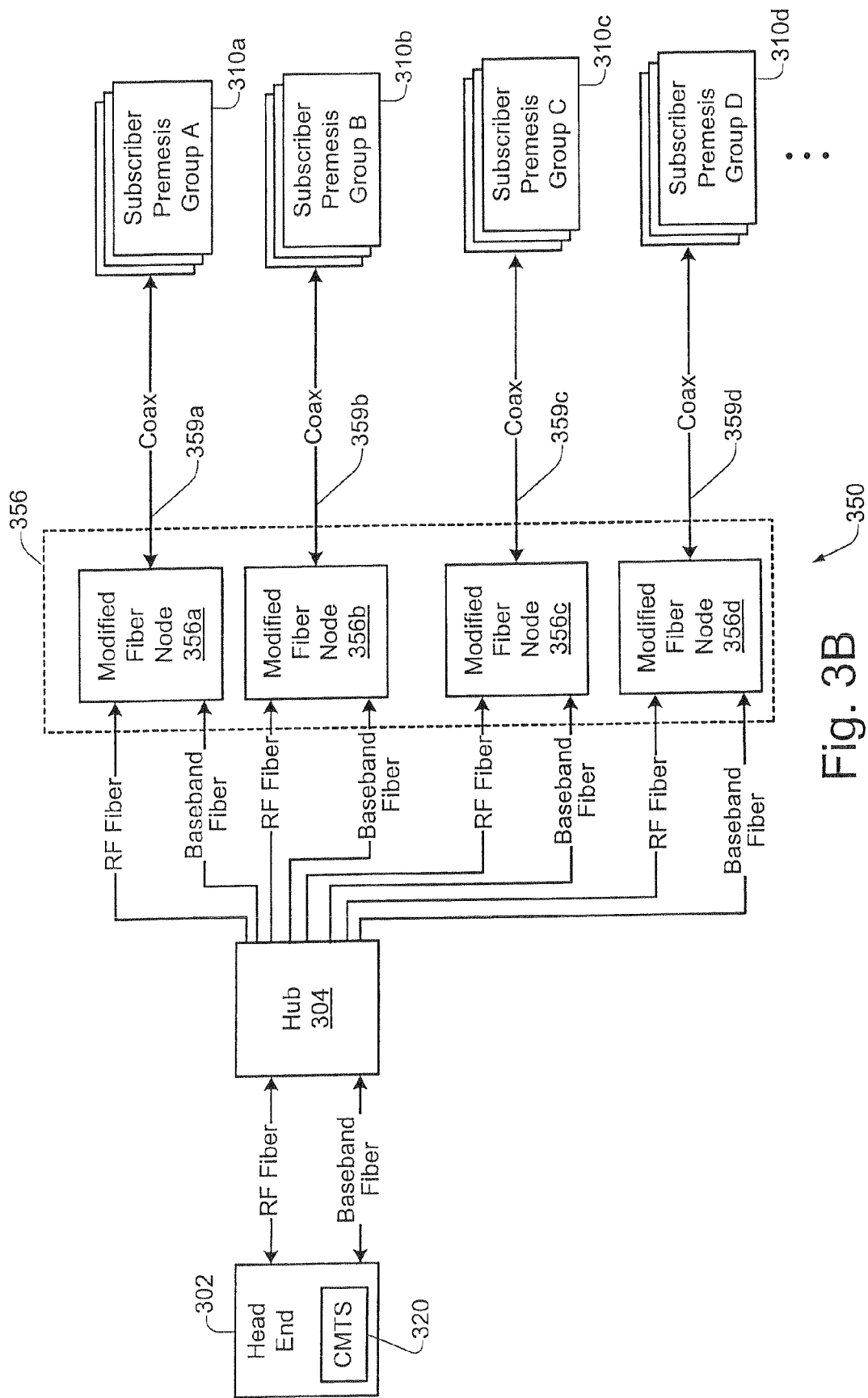
FIG. 3B shows an alternate embodiment of a modified cable network 350.

FIG. 3B shows an alternate embodiment of a modified cable network 350. As shown in FIG. 3B, a different modified fiber node 356a-d is configured to service each respective subscriber group 310a-d. In this embodiment, the modified fiber node is pushed deeper into the network, resulting in greater bandwidth availability on each respective coax cable line connecting a fiber node to its respective subscriber group(s). For example, if it is assumed that the number of cable modems serviced by each coaxial fiber 359a-d is half that serviced by coax cables 309a-b of FIG. 3A, then it may be assumed that the available bandwidth on coax cable lines 359a-d has effectively doubled.

One problem with the cable network configuration of FIG. 3B is that the provisioning of additional, modified fiber nodes in the cable network infrastructure requires a significant amount of cost and overhead for implementation. One reason for this expense relates to the cost of the modified fiber node, which must be configured to include RF fiber componentry as well as baseband fiber componentry.

Another drawback to the configuration of FIG. 3B is that an independent manufacturer of DCMTS systems would need to install the DCMTS systems into conventional fiber nodes, which are typically owned by the cable network service provider. Moreover, in order to manufacture the modified fiber node, the independent DCMTS manufacturer would most likely have to partner with fiber node manufacturers, which may include competitors. Additionally, the cable network configuration of FIG. 3B does not provide the capability for scalable, independent IP networks to be built on top of conventional HFC cable plants containing conventional fiber nodes. Thus, it will be appreciated that the cable network configuration of FIG. 3B poses major deployment and business problems for independent DCMTS manufacturers and network service providers.

Additionally, because each conventional fiber node must be modified to include a DCMTS and broadband fiber capabilities, deployment of the cable network 350 of FIG. 3B may result in significant service disruptions to end users during the modification of the conventional cable network.

Contrary to efforts in the cable industry to implement a modified fiber node which is capable of supporting both baseband and broadband fiber optic communication, an alternate embodiment of the present invention departs from conventional wisdom by dividing the problem, whereby two distinct types of fiber nodes are implemented in the cable network. This is shown, for example, in FIG. 5 of the drawings.

Figure 2:
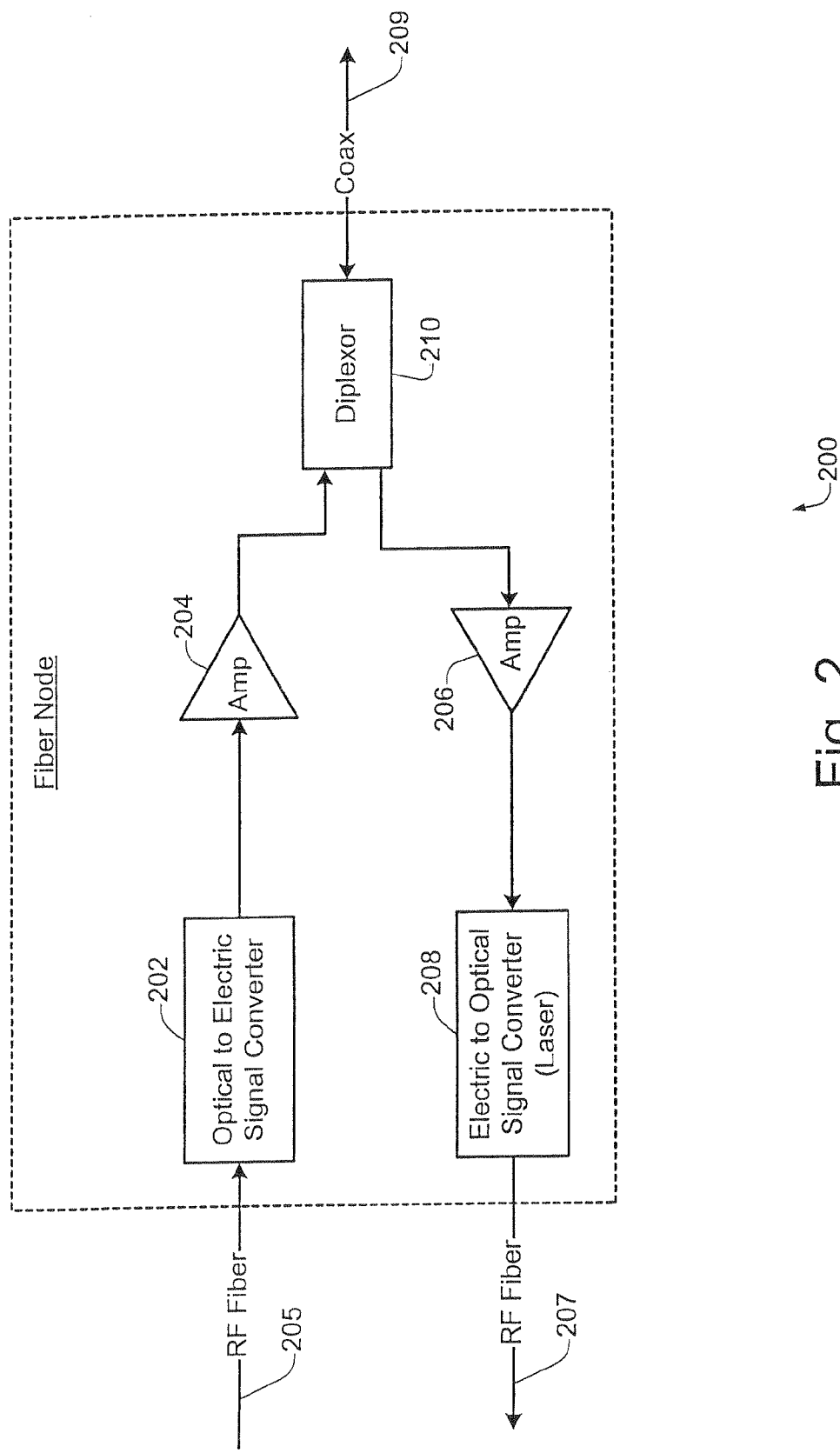
FIG. 2 shows a block diagram of a conventional fiber node 200 such as, for example, fiber node 106a of FIG. 1.
Figure 5:
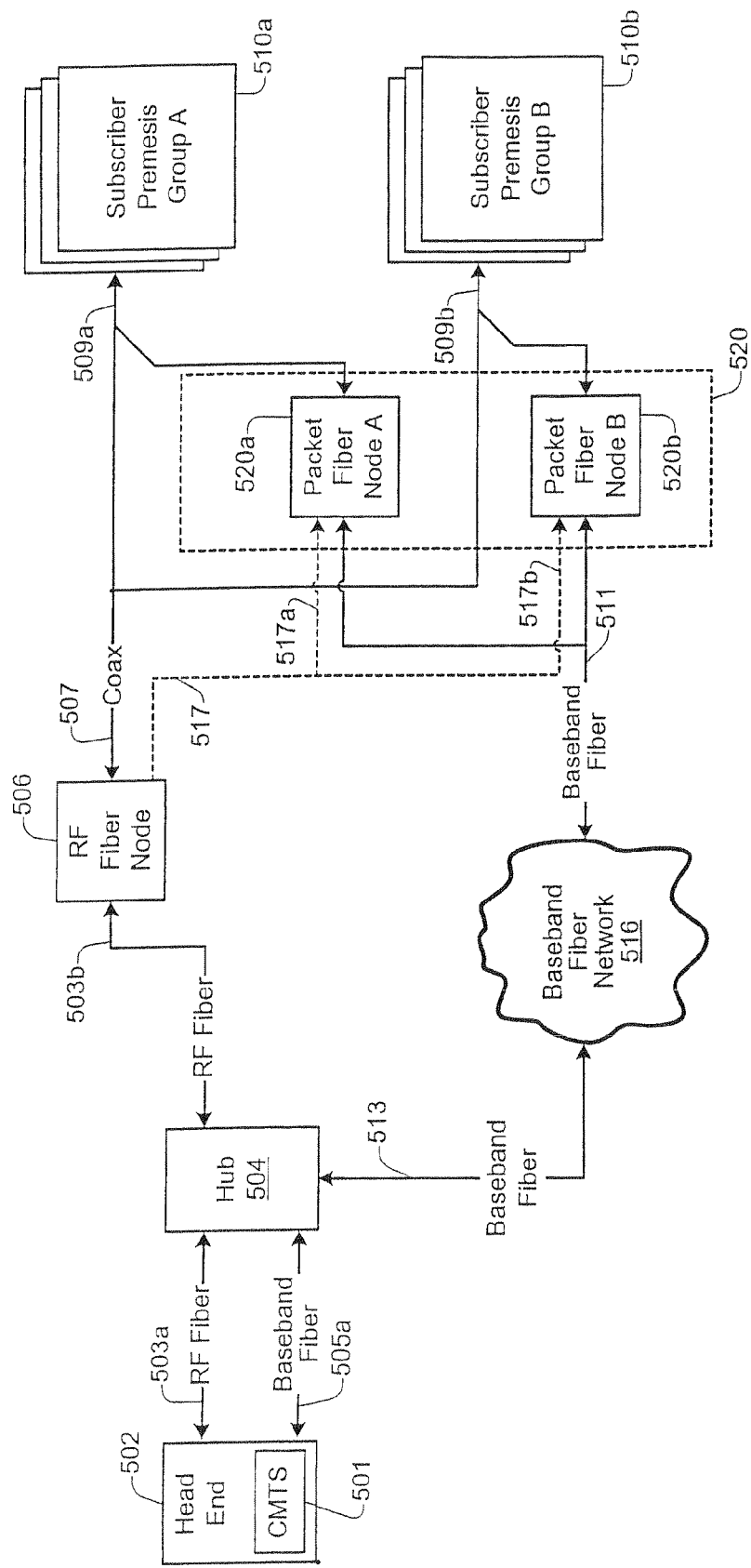
FIG. 5 shows a block diagram of a cable network 500 in accordance with a specific embodiment of the present invention.

FIG. 5 shows a block diagram of a cable network 500 in accordance with a specific embodiment of the present invention. As show in FIG. 5, the cable network 500 includes two different types of fiber nodes, namely an RF fiber node 506, and a packet fiber node (e.g. 520a). According to a specific embodiment, the RF fiber node 506 may include componentry such as that shown, for example, in fiber node 200 of FIG. 2. The RF fiber node 506 may be configured to handle all legacy RF downstream and upstream communications, and may be configured to perform additional functions associated with conventional fiber nodes.

According to the embodiment of FIG. 5, a baseband fiber network 516 is deployed which is coupled to the conventional cable network. The baseband fiber network may include a plurality of packet fiber nodes 520, which are also coupled to the conventional fiber network. In a specific implementation, the configuration, functionality, and connectivity of the conventional RF fiber nodes (e.g. 506) are the same as those in conventional cable networks, such as that shown, for example, in FIG. 1. However, the packet fiber nodes are pushed deeper into the network (i.e. closer to the subscriber groups) which, as illustrated in FIG. 5, may result in a plurality of packet fiber nodes 520 servicing the subscriber groups (e.g. 510a, 510b) which are serviced by a single RF fiber node 506. For example, the RF fiber node 506 may be configured to service 500 households past (HHP) while each packet fiber node may be configured to service 100 households past, resulting in 5 packet fiber nodes (not shown) servicing the 500 households which are serviced by the RF fiber node 506.

Figure 6:
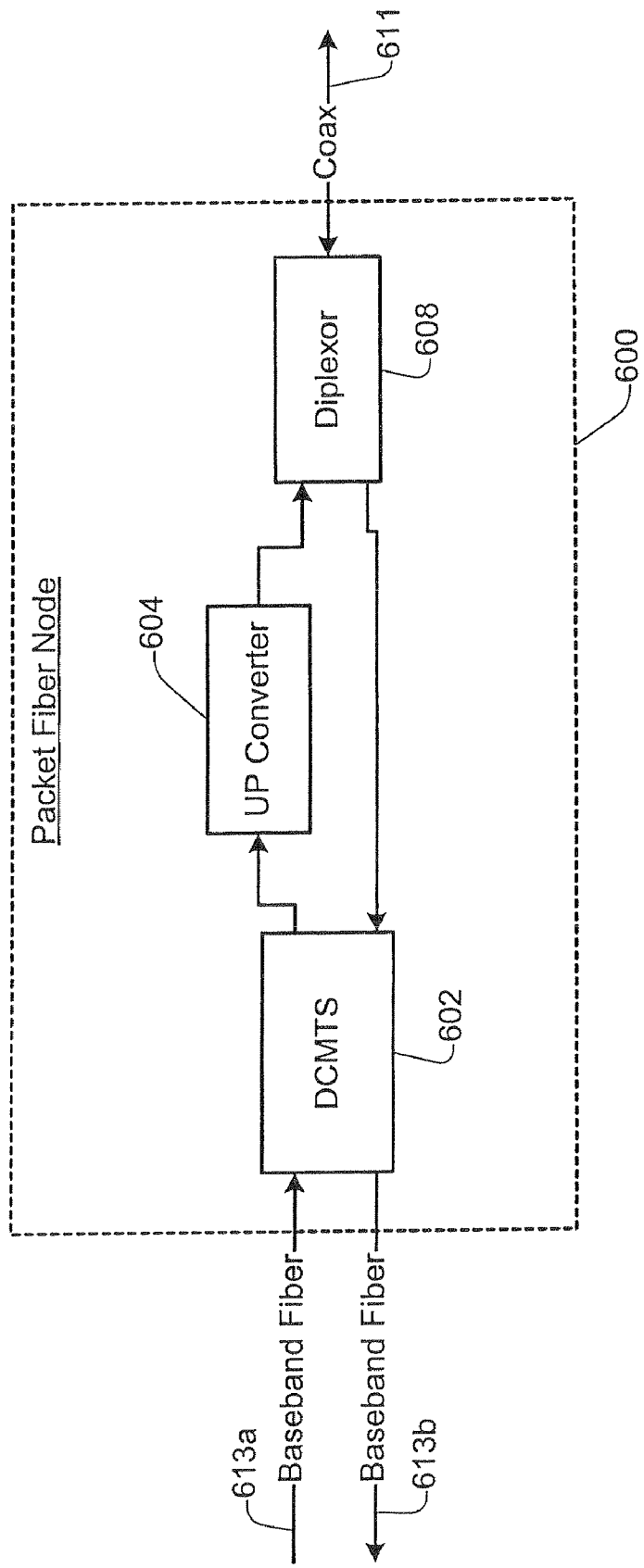
FIG. 6 shows a block diagram of a packet fiber node 600 in accordance with a specific embodiment of the present invention.

FIG. 6 shows a block diagram of a packet fiber node 600 in accordance with a specific embodiment of the present invention. According to a specific embodiment, communication with the packet fiber node 600 may be achieved using unmodulated baseband digital signals. In one implementation, communication between the Head End and the packet fiber node 600 may be achieved using a plurality of baseband optical signals which are simultaneously transmitted on different optical wavelengths using DWDM technology. Additionally, according to specific embodiments, the framing of the digital signal may be, for example, Ethernet based, digital frame structures which are based upon Ethernet, or other packet framing mechanisms.

As shown in FIG. 6, the packet fiber node 600 includes a DCMTS 602, an up converter 604, and diplexor 608. According to a specific implementation, the DCMTS 602 may be configure to perform conversions between packet protocols implemented over the fiber media 613a, 613b and DOCSIS protocols implemented on the coax media 611.

According to one embodiment, the packet fiber node (e.g. 520a) may be responsible for handling baseband communications with the Head End 502 and communications for specific DOCSIS channels which are utilized by the cable modems serviced by the packet fiber node. For example, the DCMTS 602 may be configured to handle layer 1 and layer 2 functionality such as the OSI layer management (e.g. physical layer, RF layer, hardware), MAC layer management, data link layer management, framing functionality, DOCSIS protocol functionality, etc. The RF fiber node 506 may be responsible for handling legacy RF related signals (such as, for example, set-top box signals, telemetry signals, etc.) and communications which occur on centralized DOCSIS channels.

As shown in FIG. 5, each packet fiber node may be inserted into the cable network 500 using a combiner and/or splitter which may be used to add and/or separate DOCSIS signals into from the RF lineup. According to a specific implementation, the packet fiber node may be powered from the coax media to which it is connected. According to alternate embodiments, the packet fiber node may also include a fiber transceiver or (equivalent), a combiner, a power supply, etc. In specific embodiments where gigabit interface converters (GBICs) are used, short or long range optics may also be selectively used, as desired.

In the embodiment of FIG. 5, communication between the Head End 502 and the plurality of fiber nodes 520 may be accomplished via a baseband fiber network 516. According to a specific implementation, one or more IP tunnels may be formed between the Head End 502 and the plurality of packet fiber nodes 520 in order to allow for transmission and reception of IP packets. In a specific implementation, the IP tunnel(s) may be formed between a CMTS 501 and a DCMTS (residing at one or more packet fiber nodes). The CMTS 501 may be configured to handle layer 3 functionality, including packet-related decisions, network layer decisions, IP related decisions, etc. Additionally, according to a specific implementation, the CMTS may also be responsible for handing redundancy and/or fail over functionality for selected DCMTS devices.

In addition to being configured to receive baseband optical signals, the packet fiber nodes 520 may also be configured to receive electrical signals from the RF fiber nodes via coax lines (e.g. 507A, 507B). Such electrical signals may include, for example, clock or other timing reference signals and/or timestamp synchronization signals.

One advantage of creating a separate packet fiber node 600 is that it is less costly and easier to implement than the modified fiber node described, for example, in FIG. 4 of the drawings. Additionally, by not changing the connectivity or configuration of the conventional RF fiber nodes, implementation of the cable network as shown in FIG. 5, for example, may be more cost effective and less disruptive in deployment than the implementation of the cable network 350 as shown in FIG. 3B of the drawings.

Another advantage of the packet fiber node implementation is that the packet fiber node may be used as a component for deploying fiber to the home, in the MSO environment. For example, a packet fiber node may initially utilize a DCMTS to push the IP layer deep into the network. Thereafter, the DCMTS may be removed, and the packet fiber node may then be used as a platform to deliver fiber directly to the home. Additionally, by designing a cable network to include separate packet fiber nodes as shown, for example, in FIG. 5, an independent, scalable IP network may be built on top of any existing HFC network containing any manufacturer's conventional fiber nodes. Thus, the technique of the present invention provides a solution to the deployment and business issues described previously with respect to FIG. 3B of the drawings. Additionally, the packet fiber node solution of the present invention provides MSO's with the ability to address high capacity, bandwidth, and customer needs without having to upgrade their entire HFC plants to a modified fiber node architecture such as that shown, for example, in FIG. 3B of the drawings.

An additional advantage of the packet fiber node implementation of the present invention as shown, for example, in FIG. 5 is that it allows for spatial reuse of downstream and upstream channels from each of the fiber nodes to their respective subscriber groups. In contrast, the fiber nodes of conventional HFC networks such as those illustrated, for example, in FIG. 1, are not able to spatially reuse the downstream and upstream channels for communicating with different subscriber groups.

Figure 1:
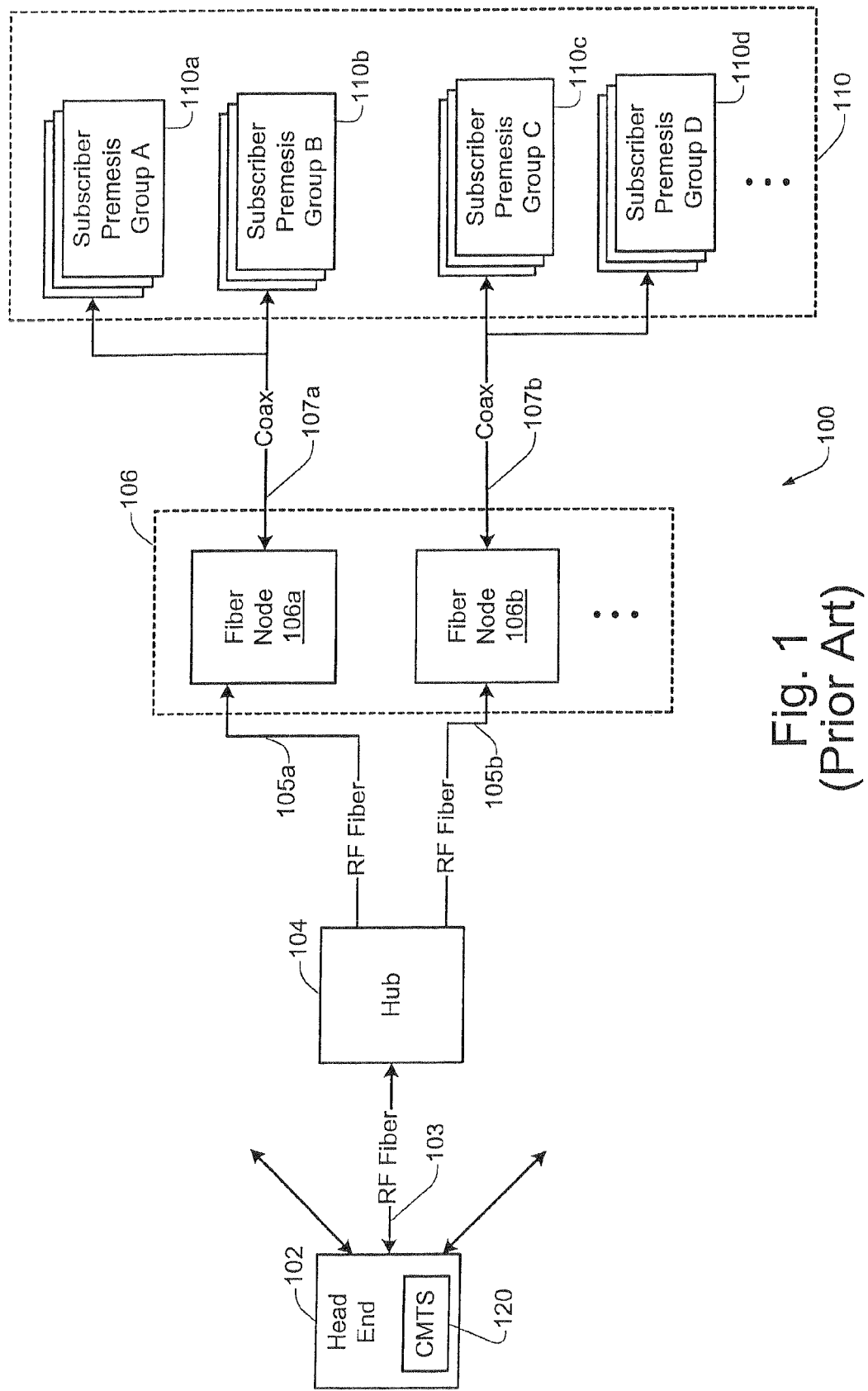
FIG. 1 shows a block diagram of a conventional cable network 100.

By way of illustration, let us assume that CMTS 120 of FIG. 1 communicates with cable modems in Subscriber Group A 110a via fiber node 106a and coax line 107a using a first downstream channel having a frequency of 550 MHz. If different information is to be communicated to cable modems in Subscriber Group B 110b, CMTS 120 is not able to use the 550 MHz downstream channel for this purpose since that channel frequency is already being used to communicate with cable modems in Subscriber Group A. However, referring to FIG. 5, since the packet fiber nodes 520 may be configured to include DCMTS devices which handle DOCSIS functionality, CMTS 501 may communicate with Packet Fiber Nodes A and B (520*a*, 520*b*) via the baseband fiber network 516, whereupon Packet Fiber Node A may then communicate with cable modems in Subscriber Group A 510*a* via coax line 509*a* using a downstream frequency of 550 MHz (for example), and Packet Fiber Node B 520*b* may communicate with cable modems in Subscriber Group B 510*b* via coax line 509*b* using the same downstream channel frequency of 550 MHz. Thus it will be appreciated that the technique of the present invention allows for the spatial reuse of downstream and upstream channel frequencies for communicating with different subscriber groups which are serviced by a single RF fiber node.

CMTS and DCMTS Configurations

FIG. 7 provides an example of a DCMTS system 700 which may be used to implement certain aspects of this invention. In the specific embodiment as shown in FIG. 7, a DCMTS 700 provides functions on three network layers including a physical layer 732, a Media Access Control (MAC) layer 730, and a network layer 744. Generally, the physical layer is responsible for receiving and transmitting modulated signals over coax lines to the cable modems. Hardware portions of the physical layer include at least one downstream modulator and transmitter 706 and/or at least one upstream demodulator and receiver 714. The physical layer also includes software 786 for driving the hardware components of the physical layer.

Electrical upstream data signals (packets) arriving via lines 710 are demodulated by a receiver 714, and then passed to MAC layer block 730. A primary purpose of MAC layer 730 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream) or to the CMTS (if sent upstream) by a MAC layer block 730 in DCMTS 700. Note that the cable modems also include MAC addressing components. In the cable modems, these components encapsulate upstream data with a header containing the MAC address of the DCMTS and/or CMTS.

MAC layer block 730 includes a MAC layer hardware portion and a MAC layer software portion. The MAC layer hardware portion includes a MAC controller 734, and may also include a processor 735. According to a specific implementation, the processor 735 may be configure to perform functions relating to MAP routing, load balancing, etc. The MAC layer software portion may include software relating to DOCSIS MAC functionality 784, MAP routing functionality 783 (if desired), load balancing functionality 785 (if desired), etc. The MAC layer hardware and software portions operate together to provide the above-described functionality. In a preferred embodiment, MAC hardware portion 734 is distinct from a general-purpose microprocessor 755, and is dedicated to performing some MAC layer functions.

In specific DCMTS configurations, the hardware portions of the physical layer 732 and MAC layer 730 reside on physical line cards 720 within the DCMTS. The DCMTS may include a plurality of distinct line cards which service particular cable modems in the network. Each line card may be configured to have its own unique hardware portions of the physical layer 732 and MAC layer 730.

After MAC layer block 730 has processed the upstream information, it is then passed to network layer block 744. According to a specific implementation, the network layer block 744 includes tunneling software 782 for causing the upstream information packet to be tunneled to via the optical fiber interface 702 to the CMTS. According to an alternate embodiment, the DCMTS may be configured to communicate with the Head End and other DCMTS devices via a standardized IP protocol.

According to a specific embodiment, the optical fiber interface 702 may also include a laser and optical-electrical signal conversion componentry for converting optical signal into electrical signals and vice-versa. In the specific embodiment of FIG. 7, the optical fiber interface 702 is configured to communicate with a CMTS (not shown) via baseband optical fibers 703.

When a packet is received at the optical fiber interface 702 from the CMTS, the network layer 744 passes the packet to MAC layer 730. MAC block 700 then transmits information via a one-way communication medium to downstream modulator and transmitter 706. Downstream modulator and transmitter 706 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

Note that alternate embodiments of the DCMTS (not shown) may not include network layer 744. In such embodiments, a DCMTS device may include only a physical layer and a MAC layer, which are responsible for modifying a packet according to the appropriate standard for transmission of information over a cable modem network. The network layer 744 of these alternate embodiments of DCMTS devices may be included, for example, as part of a conventional router for a packet-switched network. In a specific embodiment, the network layer of the DCMTS is configured as a line card coupled to a standard router that includes the physical layer block 732 and MAC layer block 730. Using this type of configuration, the DCMTS is able to send and/or receive IP packets to and from the optical fiber interface 702 using tunneling software block 782. According to an alternate embodiment, the DCMTS may be configured to include all or a selected portion of the functionality implemented at a conventional CMTS. In this latter embodiment, the DCMTS devices may be configured to handle conventional CMTS functionality, and may be aggregated via a router or switch at the Head End (illustrated, for example, in FIG. 9).

As shown in FIG. 7, DCMTS 700 includes a central hardware block 750 including one or more processors 755 and memory 757. These hardware components interact with software and other hardware portions of the various layers within the DCMTS. They provide general purpose computing power for much of the software. Memory 757 may include, for example, I/O memory (e.g. buffers), program memory, shared memory, etc. One or more data structures used for implementing the technique of the present invention may reside in such memory. Hardware block 750 may physically reside with the other DCMTS components. In one embodiment, the software entities 782, 784, and 786 are implemented as part of a network operating system running on hardware 750. According to a specific implementation, at least a part of the packet fiber node functionality of this invention are implemented in software as part of the operating system. In FIG. 7, such software may be part of MAC layer software 784 and/or the tunneling software 782, or may be closely associated therewith. Of course, the packet fiber node logic of the present invention could reside in hardware, software, or some combination of the two.

According to a specific embodiment, the procedures employed by the DCMTS during registration and pre-registration are performed at the MAC layer of the DCMTS logic. Thus, in DCMTS 700, most of the registration operations would be performed by the hardware and software provided for MAC layer logic 730. Additionally, the operations associated with obtaining an IP address for cable modems may be implemented at the network layer level 744.

In a specific embodiment, the DCMTS systems of this invention may be specially configured CMTSs or routers such as, for example, specially configured models in the uBR-7200 series and uBR-10012 series of CMTSs available from Cisco Systems, Inc. of San Jose, Calif. In an alternative embodiment, the invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific DCMTS architecture of the present invention, it is by no means the only DCMTS architecture on which the present invention can be implemented. For example, other types of interfaces and media could also be used with the DCMTS.

Regardless of network device's configuration (for cable plants or otherwise), it may employ one or more memories or memory modules (e.g., memory 757) configured to store program instructions for the network operations and other functions of the present invention described herein. The program instructions may specify an operating system and one or more applications, for example. Such memory or memories may also be configured to store data structures or other specific non-program information described herein.

FIG. 8 shows a block diagram of a specific embodiment of a Cable Modem Termination System (CMTS) 800 which may be used to implement certain aspects of the present invention. According to specific embodiments, all or selected portions of the functionality of the CMTS 800 of FIG. 8 may be implemented at the distributed CMTS 602 of FIG. 6.

As shown in FIG. 8, the CMTS 800 may comprise a plurality of routing engines (e.g. 801a, 801b). In a specific implementation, Routing Engine A 801a may be configured as a primary or working routing engine, while Routing Engine B 801b may be configured as a backup or standby routing engine which provides redundancy functionality.

As shown in the embodiment of FIG. 8, each of the routing engines may include a variety of similar modules and/or components. In order to avoid confusion, the various components and/or modules relating to Routing Engine A 801a will now be described in greater detail with the understanding that such descriptions may also be applied to the corresponding components and modules of Routing Engine B 801b.

According to a specific embodiment, Routing Engine A may be configured or designed to include a plurality of functionally different modules or components, including, for example, a Forwarding Processor (FP) Module 811a adapted to provide packet forwarding functionality; a Route Processor (RP) Module 803a adapted to implement routing or forwarding operations; a utility component 802a adapted to provide system clock and timestamp functionality; etc. The routing engine components provide may be configured to provide layer one, layer two, layer three and layer four functionality as well as quality of service (QoS) functionality.

According to a specific implementation, the RP Module 803a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 8, the RP Module 803a comprises a general-purpose processor 805a (e.g., a MIPS route processor) coupled to a system controller 809a and memory 807a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 807a may comprise synchronous dynamic random access memory (SDRAM) storage locations addressable by the processor 805a for storing software programs and data structures accessed by the components. A network routing operating system, portions of which may reside in memory and executed by the route processor, functionally organizes the router by invoking network operations in support of software processes executing on the router.

The RP processor 805a may be configured to construct and load routing tables used by the FP Module 811a. The processor 805a may also be configured or designed to perform configuration management functions of the routing engine 801a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 827a may be coupled to the respective interface circuitry 833a, 833b of line cards 831a, 831b. According to a specific implementation, interface circuitry 827a may be configured to reside on a backplane logic circuit 823a of the routing engine. In one example, the backplane logic circuit 823a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 825a and a forwarding engine 821a of the FP Module 811a. The packet buffer 825a may include memory which is configured to store packets as the forwarding engine 821a performs its packet forwarding functions. For example, the packet buffer may be used to store low priority data packets while high priority, low latency voice packets are forwarded by the forwarding engine to a data network interface 835a. According to various embodiments, the FP Module 811 may comprise a processor 813a and memory 815a for handling transport layer 817 and network layer 819 functionality. In one implementation, the processor 813a may be configured to track accounting, port, and billing information for various users on a cable modem network 851. The processor 813a may also be configured to maintain desired service flow or session state information in memory 815a such as, for example, for voice calls initiated over the cable modem network. The FP Module 811a may also be configured to provide transaction compacting functionality, data parcel tunneling functionality, switching functionality, and other functionality described herein.

According to a specific implementation, Routing Engine A 801*a* may be connected to Routing Engine B 801*b* via at least one link 846, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 831, 835) via point-to-point links. For example, as shown in FIG. 8, each of the plurality of line cards 831 and 835 are connected to each of the routing engines 801*a*, 801*b* via point-to-point links 841 and 843. One advantage of the point-to-point link configuration is that it provides additional reliability in that the failure of one or more line cards will not interfere with communications between other line cards and the routing engine(s). For example, if Line Card A 831*a* suddenly failed, each of the routing engines would still be able to communicate with the other line cards.

According to a specific embodiment, the plurality of line cards may include different types of line cards which have been specifically configured to perform specific functions. For example, Line Card A 831*a* may correspond to radio-frequency (RF) line card which has been configured or designed to transmit and receive RF modulated optical signals. Line Card B 831*b* may correspond to baseband line card which has been configured or designed to transmit and receive baseband optical signals. Additionally, line cards 835 may correspond to network interface cards which have been configured or designed to interface with different types of external networks (e.g. WANs, LANs,) utilizing different types of communication protocols (e.g. Ethernet, Frame Relay, ATM, TCP/IP, etc). For example the data network interface 835*a* functions as an interface component between external data sources and the cable system. The external data sources transmit data to the data network interface 835*a* via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 819*a*.

According to a specific implementation, the operations associated with obtaining an IP address for cable modems may be implemented by the network layer software. This may involve the CM communicating with a DHCP server (not shown) via a data network interface, for example.

As shown in FIG. 8, at least a portion of the line cards includes interface circuitry for providing an appropriate interface between the host line card, other line cards, and/or the routing engine(s). For example, interface circuitry 833*a* may include interconnect ports coupled to one or more of the point-to-point links 841, 843. According to a specific implementation, the interface circuitry functions as a translator that converts conventional formats of data received at the line cards to a suitable protocol format for transmission from the line card to the appropriate routing engine. In one implementation, the interface circuitry 833*a* may also include circuitry to perform cyclic redundancy code (CRC) generation and checking on packets, along with interconnect format checking.

According to a specific embodiment, the point-to-point links 841, 843 may be configured as clock forwarded links such that each point-to-point link comprises at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (801*a*, 801*b*) and a portion of the cable network. The data network interface 835*a* may couple the routing engine 801*a* to an external data network 855 such as, for example, the Internet.

According to one embodiment, all or selected lines cards, routing engines and/or data network interfaces may be configured to use at least one common dedicated line or backplane (e.g. 845). According to other embodiments, the routing engines 801*a*, 801*b* may have an additional dedicated connection(s) for supporting redundancy. In a specific implementation, the backplane may be configured as an Ethernet medium that is shared by the CMTS. When the line cards are inserted into the backplane, they communicate with the routing engines over the lines 845 in accordance with a "capabilities" exchange that identifies the types of line cards and their various characteristics/parameters.

According to a specific implementation, during initialization of the CMTS, the routing engines 801*a* and 801*b* negotiate for working routing engine status over the backplane. Assertion of working status causes the line cards 831 to configure their respective interface circuitry to communicate with the designated working routing engine (e.g. Routing Engine A 801*a*). The Routing Engine A 801*a* then configures the CMTS and line cards, establishes routing relationships, and initiates traffic forwarding operations. The redundant routing engine 801*b* may complete a self-test and perform initialization of its various functions. The two routing engine assemblies may then exchange conventional negotiation messages (which may include, for example, health and status messages) via the backplane lines 845. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 801*b* detects that the primary routing engine has failed, the redundant routing engine may take over as the new working routing engine, and initiate a "cutover" operation to thereby cause the line card interface circuitry (e.g. 833*a*, 833*b*) to identify and communicate with the new working routing engine 801*b*. The new working routing engine 801*b* may then access and retrieve state information (such as, for example, telephone call state information, service flow state information, etc.) stored on selected line cards in order to maintain existing service flows.

Prior to a failure situation, the redundant routing engine 801*b* may be configured to monitor the status of the working routing engine 801*a*, and may further be configured or designed to receive updated configuration, transaction and/or state information, which may then be stored in an appropriate location in the redundant routing engine 801*b*.

The line cards may further comprise circuitry for "looping" packets back onto the redundant routing engine 801*b* over the point-to-point links. This allows the redundant routing engine 801*b* to send and receive test packets to evaluate its own operation in addition to the operation of the dedicated lines prior to the occurrence of a system failure.

Although the system shown in FIG. 8 represents one specific CMTS architecture of the present invention, it is by no means the only CMTS architecture on which the present invention can be implemented. For example, other types of interfaces and media could also be used with the CMTS. According to different embodiments, the CMTS system of the present invention may be implemented as a "routing" CMTS which handles at least some routing functions. Alternatively, the CMTS may be a "bridging" CMTS which handles only lower-level tasks.

Regardless of the network device's configuration (for cable plants or otherwise), it may employ one or more memories or memory modules (e.g., memory 807a, 815a, etc.) configured to store program instructions for the network operations and other functions of the present invention described herein. The program instructions may specify an operating system and one or more applications, for example. Such memory or memories may also be configured to store data structures, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Aspects of the invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated that, according to specific embodiments, the packet fiber node of the present invention may be implemented in a variety of different cable network configurations. For example, according to one embodiment, as shown, for example, in FIG. 9, the cable network may include a Head End complex which comprises various components and/or systems such as, for example, a Head End, a super Head End, a hub, a primary hub, a second hub, etc.

Figure 10:
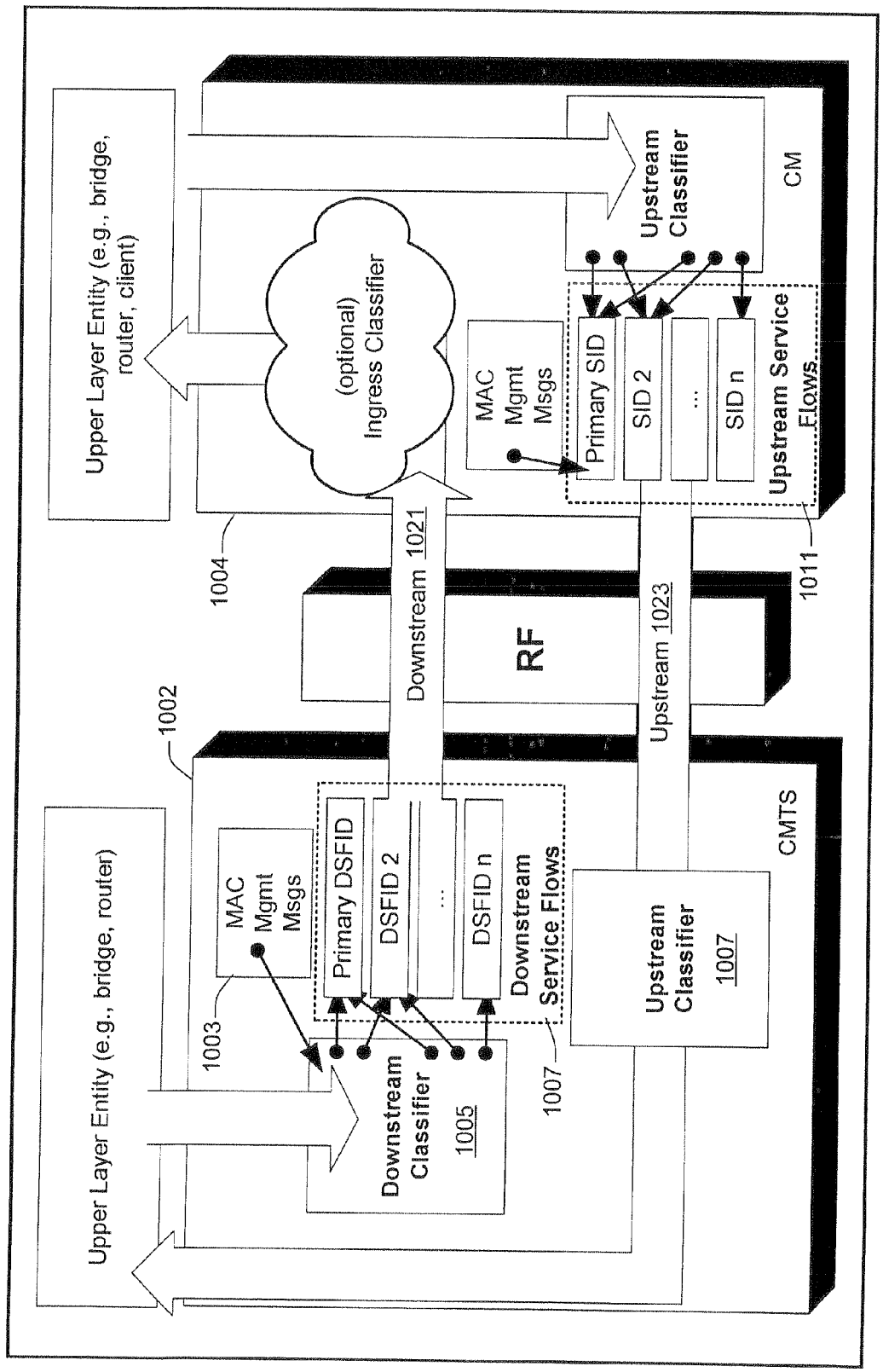
FIG. 10 shows an example of a cable network 1000 implemented in accordance with a standardized DOCSIS protocol.

FIG. 10 shows an example of a cable network 1000 implemented in accordance with a standardized DOCSIS protocol such as the well-known DOCSIS 1.1 RF Interface Specification (document control number SP-RFIv1.1-I04-000407, Apr. 7, 2000. As illustrated in the example of FIG. 10, cable network 1000 includes a CMTS 1002, which, for example, may be located at the Head End of the cable network. In at least one embodiment, the CMTS 1002 includes functionality for performing one or more of the following operations: service flow management operations relating to downstream channel service flow management (e.g., 1007); packet classification operations relating to downstream channel classification (e.g., 1005); MAC management operations relating to MAC management of downstream channels (e.g., 1003); etc.

Figure 9:
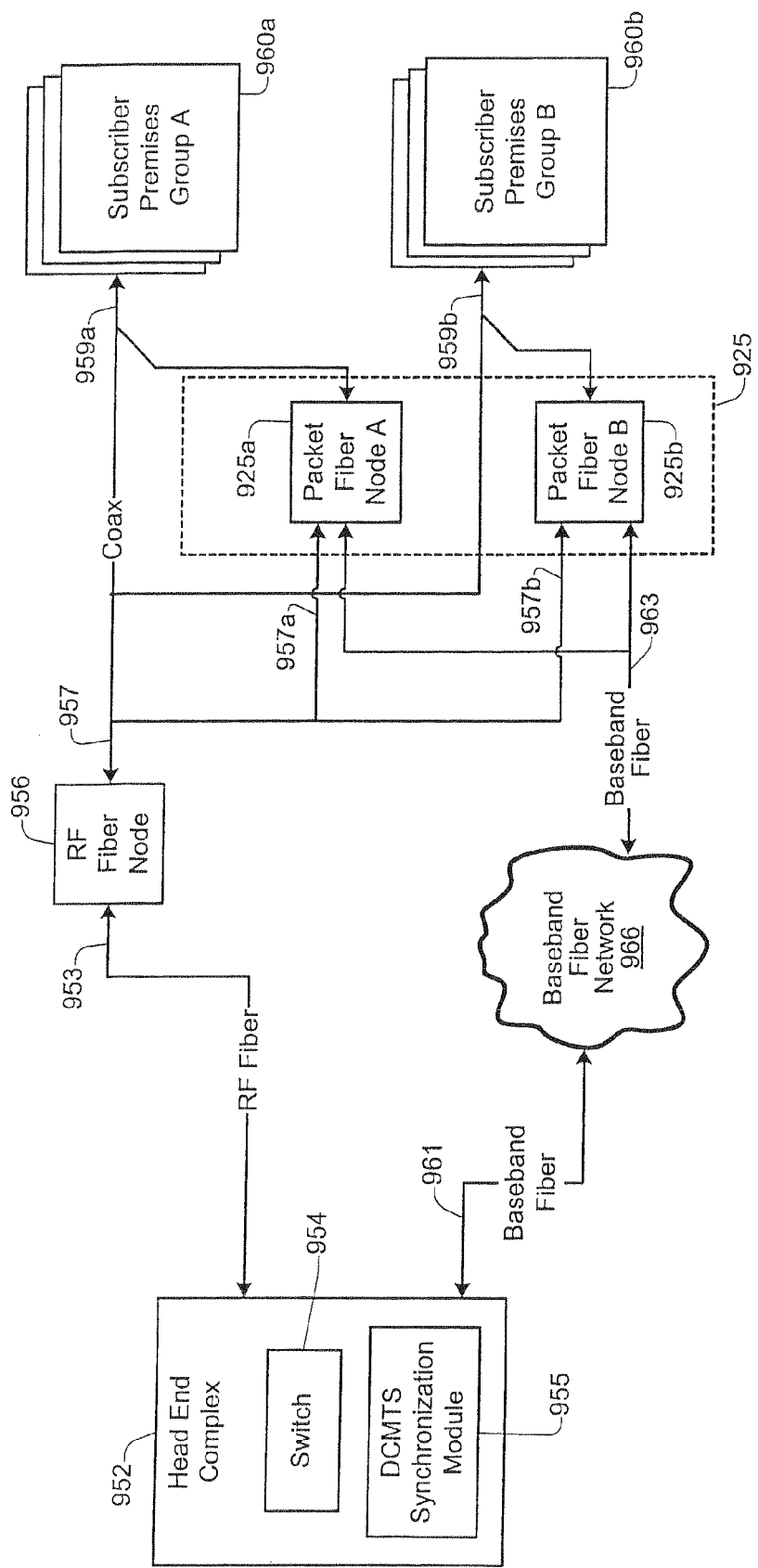
FIG. 9 shows an alternate embodiment of a cable network 950 which may be used for implementing various aspects of the present invention.

It will be appreciated that, according to a specific embodiments, at least a portion of functions described herein which are performed by the DCMTS (e.g., FIG. 7), CMTS (e.g., FIGS. 8, 10), or selected components thereof, may be implemented in a centralized CMTS system (e.g. residing the Head End of the cable network, as shown, for example, in FIG. 5), and/or may be implemented at one or more distributed CMTS (DCMTS) systems (e.g. residing at one or more fiber nodes, as shown, for example, in FIG. 9). For example, in one embodiment, the DCMTS may permit the centralized CMTS (at the Head End) to perform a first portion of functions while the DCMTS performs a second portion of functions.

Other Embodiments

FIG. 9 shows an alternate embodiment of a cable network 950 which may be used for implementing various aspects of the present invention. In the cable network of FIG. 9, the centralized CMTS typically residing at the Head End complex 952 has been removed, and its functionality incorporated into selected DCMTS devices residing in the packet fiber nodes 925. Thus, according to the embodiment of FIG. 9, selected DCMTS devices residing in the packet fiber nodes 925 may be configured to implement the functions typically implemented by the centralized CMTS device, such as, for example, layer 3 functionality and/or at least a portion of the functionality performed by the various logic described with respect to FIGS. 7 and 8 of the drawings.

According to a specific embodiment, communication of IP packets between the Head End complex 952 and the plurality of packet fiber nodes 955 may be accomplished without the use of a tunneling protocol. In such an embodiment, communication between network devices may be accomplished using, for example, a standardized IP protocol. Additionally, as shown in the embodiment of FIG. 9, the Head End complex 952 may include a switch 954 (e.g. Ethernet switch), or other type of traffic handling device which may be configured to route or forward traffic between network devices in the cable network 950, or between the devices in the cable network and devices in external networks. Further, as shown in the example of FIG. 9, the Head End complex may also include a DCMTS Synchronization Module 955 which may be configured to provide synchronized clock reference signals and/or synchronized timestamp information to the plurality of packet fiber nodes 925.

It will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A system, comprising:
a centralized Cable Modem Termination System (CMTS) component operating between a first network and a second cable network and configured to provide a plurality of cable modems access to the first network, wherein the centralized CMTS component is configured to perform a first portion of Data Over Cable Service Interface Specification (DOCSIS) processing on received packet traffic;
a distributed node located remotely from the centralized CMTS component and configured to perform, on communications received from the centralized CMTS component, a remaining second portion of the DOCSIS processing not performed by the centralized CMTS component, wherein the distributed node comprises:
a first interface configured to communicate with the centralized CMTS component;

a second interface in communication with the first interface and configured to communicate with the plurality of cable modems that are located in the second cable network;

circuitry in communication with the first and second interfaces and configured to perform the remaining DOCSIS processing, wherein the circuitry is configured to perform at least one selected from the group including downstream modulation, ranging, registration, generation of channel MAP messages, and generation and termination of Media Access Control (MAC) messages; and the circuitry configured to transfer packets through the first interface and over a portion of the second cable network to the centralized CMTS component;

wherein the portion of the second cable network is located between the centralized CMTS component and the distributed node such that the distributed node is remotely located with respect to the centralized CMTS component.

2. The system of claim 1 wherein the circuitry is configured to establish one or more Internet Protocol (IP) tunnels for transferring the communications.

3. The system of claim 1 wherein the communications are passed from the centralized CMTS to the distributed node in digital form and the circuitry is configured to perform Quadrature Amplitude Modulation (QAM) to format the communications for transmission over a plurality of QAM channels extending to the cable modems.

4. The system of claim 1 wherein the first portion of DOCSIS processing includes a MAC layer operation.

5. An apparatus, comprising:
a first interface configured to communicate with a centralized Cable Modem Termination System (CMTS) component of a cable network through an Internet Protocol (IP) network;
a second interface in communication with the first interface and configured to communicate with one or more cable modems located in the cable network;
circuitry in communication with the first and second interfaces and configured to perform, on Data Over Cable Service Interface Specification (DOCSIS)-processed traffic received from the centralized CMTS component, a selected portion of CMTS functionality that is not performed by the centralized CMTS component, wherein the apparatus operates separately from the centralized CMTS and communicates with the centralized CMTS across the IP network, and wherein the selected portion of the CMTS functionality is quadrature amplitude modulation;
the circuitry configured to transmit the quadrature amplitude modulated traffic over Radio Frequency (RF) channels extending to the cable modems using the second interface.

6. The apparatus of claim 5 wherein the traffic is received over an IP tunnel, and wherein the received traffic is formatted according to DOCSIS Media Access Control (MAC) operations performed thereon prior to being received on the first interface.

7. The apparatus of claim 5 wherein the circuitry is configured to establish IP tunnels with the centralized CMTS component, the IP tunnels for transmitting the traffic from the centralized CMTS component to the apparatus.

8. A system, comprising:
a head end component located between a cable network and an access network, the head end component configured to perform a first portion of processing on data received over the access network, wherein the first portion of the processing includes Media Access Control (MAC) operations associated with a Data Over Cable Service Interface Specification (DOCSIS) protocol;
a node located remotely with respect to the head end component and a plurality of cable modems of the cable network, the node configured to perform a second portion of the processing on the data from the head end component; and
the node configured to transmit the processed data over Radio Frequency (RF) channels extending from the node to the cable modems;
wherein the head end component and the node form a distributed Cable Modem Termination System (CMTS) that extends across the cable network.

9. The system of claim 8 wherein the node is configured to perform downstream modulation on the data from the head end component.

10. The system of claim 8 wherein the node is configured to range with the cable modems.

11. The system of claim 8 wherein the head end component is configured to perform packet classification operations relating to downstream channel classification.

12. The system of claim 8 wherein the head end component is configured to conduct MAC management operations relating to MAC management of downstream channels.

13. The system of claim 8 wherein the data is transmitted from the head end component to the node in a digital form and is not modulated for RE transmission.

14. The system of claim 8 wherein the node is configured to register the cable modems.

15. The system of claim 8 wherein the node is configured to generate channel MAP messages.

16. A system, comprising:
a distributed node configured to communicate with a centralized Cable Modem Termination System (CMTS) component that operates between a first network and a second cable network and provides a plurality of cable modems access to the first network from the second cable network;
wherein, when operating, the distributed node forms a distributed CMTS with the centralized CMTS component;
the distributed node configured to receive, from the centralized CMTS component, packet traffic that has been partially Data Over Cable Service Interface Specification (DOCSIS)-processed by the centralized CMTS component;
the distributed node configured to perform, on the received packet traffic, a remaining portion of the DOCSIS processing, wherein the remaining DOCSIS processing includes quardrature amplitude modulation; and
the distributed node configured to transmit the quadrature amplitude modulated data over Radio Frequency (RF) channels extending from the distributed node to the cable modems.

17. The apparatus of claim 16, wherein the centralized CMTS component is configured to perform Media Access Control (MAC) operations associated with the DOCSIS protocol on the packet traffic before transmitting the packet traffic to the distributed node over an Internet Protocol (IP) tunnel.

18. The apparatus of claim 16, wherein the packet traffic is received over an IP tunnel, and wherein the received packet traffic is formatted according to DOCSIS MAC operations performed thereon prior to being received by the distributed node.

* * * * *

UNITED STATES PATENT AND TRADEMARK OFFICE
CERTIFICATE OF CORRECTION

| | | |
|---|---|---|
| PATENT NO. | : 7,639,620 B2 | Page 1 of 1 |
| APPLICATION NO. | : 11/682832 | |
| DATED | : December 29, 2009 | |
| INVENTOR(S) | : Chapman | |

It is certified that error appears in the above-identified patent and that said Letters Patent is hereby corrected as shown below:

Title page, at page 1, in the Abstract Item (57), line 3, please replace "convention RF" with --conventional RF--.
At column 18, line 27, please replace "RE transmission" with --RF transmission--.

Signed and Sealed this

Thirteenth Day of April, 2010

David J. Kappos
*Director of the United States Patent and Trademark Office*